United States Patent [19]

Verzwyvelt

[11] 4,217,404
[45] Aug. 12, 1980

[54] POLYPROPYLENE SEPARATOR FOR USE IN ALKALINE STORAGE BATTERIES AND PROCESS FOR MAKING SAME

[75] Inventor: Scott A. Verzwyvelt, Thousand Oaks, Calif.

[73] Assignee: Hughes Aircraft Company, Culver City, Calif.

[21] Appl. No.: 953,511

[22] Filed: Oct. 23, 1978

[51] Int. Cl.$^2$ .............................................. H01M 2/16
[52] U.S. Cl. ................................... 429/206; 429/250; 427/430.1
[58] Field of Search ....................... 429/206, 250, 254; 427/244, 245, 246, 430 R

[56] References Cited

U.S. PATENT DOCUMENTS

| | | | |
|---|---|---|---|
| 3,856,549 | 12/1974 | Daukays | 427/430 R |
| 3,929,509 | 12/1975 | Taskier | 429/250 |
| 3,933,525 | 1/1976 | Palmer et al. | 429/254 |
| 4,110,143 | 8/1978 | Cogliano et al. | 429/250 |
| 4,122,133 | 10/1978 | Bernstein et al. | 429/206 |

Primary Examiner—Donald L. Walton
Attorney, Agent, or Firm—Booker T. Hogan, Jr.; William MacAllister

[57] ABSTRACT

Intrinsically nonwettable polypropylene battery separators are rendered wettable by treating them with polybenzimidazole.

Polybenzimidazole (PBI) treated polypropylene (PP) separators exhibited excellent thermal and chemical stabilities, show excellent electrolyte retention, and are gas permeable.

9 Claims, No Drawings

POLYPROPYLENE SEPARATOR FOR USE IN ALKALINE STORAGE BATTERIES AND PROCESS FOR MAKING SAME

RELATED INVENTION

U.S. application Ser. No. 948,119 filed Oct. 2, 1978 by Lim, Rogers and Applicant herein, discloses a process for reinforcing mechanically fragile inorganic materials with polymers which include PBI.

U.S. application Ser. No. 953,523 filed Oct. 23, 1978 by Hong Sup Lim and Applicant discloses a novel Inorganic-Composite Felt for use as a separator in an alkaline storage cell.

The inorganic-organic separators of the above related applications differ from the totally organic separators of this application.

FIELD OF THE INVENTION

This invention relates generally to the fabrication of separators for use in alkaline storage batteries and particularly to the improvement of polypropylene separators designed to be employed in nickel cadmium storage batteries.

In an even more specific aspect, the present invention resides in the provision of a wettable coating for intrinsically non-wettable polypropylene and other non-wettable chemically inert polymers.

BACKGROUND OF THE INVENTION

A life limiting factor in the design of nickel cadmium batteries has been the life of the separators utilized in the fabrication of the batteries. The nickel-cadmium spacecraft batteries utilize aqueous potassium hydroxide (KOH) solutions as the electrolyte, and operate under electrolyte starved conditions. State-of-the-art nickel-cadmium batteries contain separators fabricated from either a nylon or polypropylene felt that has been treated with a wetting agent. These separators are life limited because of the chemical instability of nylon and the chemical instability of the polypropylene wetting agent in the battery electrolyte.

In particular polypropylene battery separators, because of the intrinsic non-wettability of the material, tend to cause battery failures because of separator dry outs and low electrolyte retention. Attempts to solve this problem by adding wetting agents to the polypropylene separators have been unsuccessful because of the instability of the wetting agents when exposed to aqueous potassium hydroxide solutions.

It is therefore an objective of the invention disclosed herein to provide an improved separator for use in alkaline storage batteries; an additional objective of the invention disclosed herein is to provide a novel means for increasing the wettability of polypropylene and other intrinsically nonwettable chemically inert materials designed to be used as separators for storage batteries; and a still further objective of this invention is to provide an inexpensive stable porous organic separator for use in alkaline storage batteries.

SUMMARY OF THE INVENTION

To accomplish the above-stated objectives and provide an improved porous organic separator for use in alkaline storage batteries, it has been discovered that intrinsically non-wettable polymers, such as polyethylene, polypropylene, etc., can be coated with a wettable, in aqueous KOH solutions, polymer and thereby rendered suitable for use in the fabrication of battery separators having improved electrolyte retention characteristics and excellent chemical stability without altering other properties of the polymers.

Polymer fabrics manufactured from a group of chemically inert intrinsically non-wettable polymers such as polyethylene, and polypropylene are immersed in and saturated with a coating solution comprised of a chemically stable wettable polymer such as, polybenzimidazole, polybenzoxazole, and polybenzothiazole, dissolved in a polar solvent. The solvent is removed by evaporation or precipitation techniques and a thin film of the stable wettable polymer is retained by the fibers of the fabric.

When dried at temperatures not to exceed 100° C., the coated fabric is wettable in aqueous KOH solutions, retains electrolytes and is chemically stable.

The coatings and coating process of this invention are suitable for providing a wettable surface on intrinsically non-wettable polymer films, sheets or rods as well as fibers.

DETAILED DESCRIPTION OF THE PREFERRED EMBODIMENT

This invention describes the treatment of nonwettable polymer substrates such as polypropylene with wettable polybenzimidazole therefore—polybenzoxazole, and polybenzothiazole. The resultant wettable material is suitable for application as a separator material in alkaline storage batteries such as nickel cadmium batteries. Polypropylene is chemically inert and intrinsically non-wettable. Polybenzimidazole is also chemically inert, but is very wettable in aqueous solutions. In the technique described below it is possible to coat polypropylene permanently with polybenzimidazole. The coating of polybenzimidazole affords the polypropylene substrate with good electrolyte wettability, vastly improved electrolyte retention, and better ionic conductivity in the electrolyte wet state. At the same time, the structural form of the polypropylene substrate is unchanged and therefore the original gas permeability is largely retained.

The treatment of polypropylene with PBI is accomplished in the following general manner: the polypropylene substrate is washed with acetone or 100° water to remove any contaminants and dried. Subsequently, it is immersed in an impregnation solution of PBI dissolved in dimethylacetamide (DMA), dimethylsulfoxide (DMSO), or dimethylformamide (DMF). The PBI solution wetted sample is removed, drained, and blotted under controlled compression for a specified time period. Physical parameters such as blotting time, temperature and compression are monitored and controlled to insure reproducible results. Then, the solvent is either evaporated off leaving the PBI coating on the surface of the polypropylene fibers or the PBI is precipitated on the surface of the fibers by treating with an extractant liquid in which PBI is insoluble and the PBI solvent is miscible. Finally, the sample was dried in an oven.

The polybenzimidazole coating achieved by precipitation demonstrates superior wettability and electrolyte retention to that achieved by evaporation as cited in U.S. application Ser. No. 948,119. In the evaporation and drying steps of the technique, it is important not to exceed the melting point of the polypropylene or inert polymer substrate. The initial structure of the polypropylene is important in determining electrode spacing, gas permeability and dendrite penetration. It is possible to increase electrolyte retention, electrolyte wettability and to some extent gas permeability by not only the method of coating (evaporative or precipitative), but in the case of precipitation, by the quantity of polybenzimidazole loading. By increasing the impregnation solution concentration, by reducing the extent of draining and blotting, and by successive layers of coatings it is possible to apply thicker layers of polybenzimidazole. This can potentially increase electrolyte wettability, electrolyte retention, but may, if brought to an extreme, reduce gas permeability. This should allow some latitude in the separator characteristics when specific requirements are present.

EXAMPLE I

Prepare a mixture of PBI and DMA by adding 15 grams of PBI and 0.03 grams of lithium chloride to 100 ml of DMA. Reflux and stir for 16 hours or until essentially all of the PBI is dissolved into the DMA. Filter to remove any undissolved PBI from the resulting solution and allow to cool.

Remove all traces of surfactants and/or other contaminants from the surfaces of a polypropylene fabric by washing the fabric in boiling water and acetone.

Dry the washed fabric and immerse in the PBI/DMA solution for at least 15 minutes. The immersion step should be performed in a container provided with a means for precluding the loss of solvent from the solution by evaporation.

The soaked fabric or sample is then removed from the PBI/DMA solution, allowed to drain and blotted to remove excess PBI/DMA solution from the surface which leaves a coating of PBI and DMA on the surface of the fibers of the fabric.

The PBI solution wetted polypropylene is then immersed in an extractant liquid ($H_2O$ at 100° C.). This immersion is accomplished while holding the sample in a plane vertical to the liquid surface. The sample is left in the extractant liquid for at least 5 minutes before removal where it is dried at 100° C. in an air oven. The 100° water extracts the solvent (DMA) from the impregnation solution, thereby precipitating a PBI film on the polypropylene fibers. The resultant PBI adhesion to polypropylene is good.

EXAMPLE II

Prepare a solution of 5% w/v PBI in dimethylformamide and add from 0.075 to 0.15% lithium chloride to stabilize the solution.

Remove all contaminants from a polypropylene felt by washing the felt in acetone and drying it in air.

Immerse the felt in the PBI solution and blot to remove excess solution as described in Example I.

Place the blotted sample on a screen in a vacuum oven and remove the solvent from the coating by pulling a vacuum on the coated sample for four hours at 100° C. The sample should be isolated from any heat sinks as it is placed in the oven.

Samples prepared in this manner are coated with a thin film of PBI and tend to be less wettable in KOH than samples prepared via precipitation of the polymer from the polymer solvent solution as in Example I.

EXAMPLE III

Remove all contaminants from a tetrafluorethylene 30–50$\mu$ microporous membrane by washing it in acetone and drying it in air.

Place the decontaminated sample in a vacuum chamber adapted to provide a liquid to said chamber under vacuum.

Allow a 7% w/v PBI/DMA impregnation solution to be vacuum backfilled into the pores of said membrane. Vacuum backfilled is intended to describe the process of allowing a liquid to flow onto a porous membrane under vacuum. This affords better penetration of the polymer into the pores of the membrane.

Remove the impregnated sample from the chamber and blot to remove excess solution from the surface as described in Example I.

Extract the solvent from the solution impregnated sample by the precipitation process described in Example I.

EXAMPLE IV

Polypropylene and nylon rods are washed in acetone to remove surface contaminants prior to their immersion in a PBI/DMA solution prepared in accordance with the method of Example I.

Excess solution is allowed to drain from the surface of the rods and the solvent is extracted from the solution by either of the processes taught above.

The net results are solid rods coated with a wettable layer of PBI which adheres to the rods.

What is claimed is:

1. The process of providing an improved organic separator that is chemically resistant to and wettable by an aqueous KOH solution for use in alkaline storage batteries comprising the steps of:
   a. providing an uncontaminated fabric comprised of fibers selected from the group consisting of polyethylene, polypropylene, and polybutylene, suitable for use as a separator;
   b. forming a coating solution by dissolving a polymer selected from the group consisting of polybenzimidazole, polybenzoxazole, and polybenzothiazole in a selected polar solvent;
   c. immersing said fabric in said solution and allowing said fabric to soak in said solution until saturated while maintaining a constant polymer-solvent concentration;
   d. sequentially removing said saturated fabric from said soaking solution and removing any excess soaking solution from said fabric thereby leaving said fabric impregnated and coated with the solvent and polymer of said soaking solution;
   e. causing said solvent to be removed from said coating solution by subjecting said fabric to a solvent removal technique selected from the group consisting of solvent evaporation and solvent precipitation; and
   f. drying said coated fabric at an elevated temperature prior to use as a battery separator.

2. The process of claim 1 wherein said separator fabric is polypropylene, said polymer is polybenzimidazole, and said selected solvent is dimethylacetamide.

3. An improvement in porous polypropylene separators intended for use in alkaline storage batteries wherein said improvement consists of a thin coating of a stable polymer selected from the group consisting of polybenzimidazole, polybenzoxazole, and polybenzothiazole applied to the surface of said separator, which provides a wettable surface capable of resisting the chemical action of aqueous KOH electrolytes while retaining said electrolytes within the pores of said separator.

4. The improvement of claim 3 wherein said coating is a thin coating of polybenzimidazole.

5. A method of rendering extrinsically non-wettable polymeric fibers, films, sheet and rod surfaces wettable comprising the steps of providing a thin coating of a wettable polymer selected from the group consisting of polybenzimidazole, polybenzoxazole, and polybenzothiazole deposited onto the surface of said fibers, films, sheets and rods from a polymer-solvent solution, removing said solvent and drying said coating fiber, film, sheet and rod at elevated temperatures.

6. The method of claim 5 wherein said wettable polymer is removed from said polymer solvent solution by a precipitation process which leaves particles of said polymer adhering to the surface of said films, sheets, rods and fibers.

7. The method of claim 5 wherein said coating is comprised of polybenzimidazole deposited from a solution of polybenzimidazole and dimethylacetamide.

8. In an alkaline storage battery having electro members spaced apart by organic separators which retain a liquid electrolyte and provide a current path between said electrodes, an improved organic separator comprising a porous substrate of non-wettable fibers selected from the group consisting of polyethylene, polypropylene and polybutylene first polymers having a multiplicity of interstices and a thin layer of thermally stable wettable polybenzimidazole polymer formed around and about said fibers which permanently adheres to said fibers, without altering the structural characteristics of said fibers, to render them wettable in aqueous potassium hydroxide solution and permits the passage of ions and gases through said separator.

9. An improved organic separator of claim 8 wherein said first polymer is polypropylene.

* * * * *